United States Patent [19]

Becker

[11] 4,311,006
[45] Jan. 19, 1982

[54] PRESSURE COMPENSATED STEERING SYSTEM

[75] Inventor: Lanson Becker, Galesburg, Mich.

[73] Assignee: General Signal Corporation, Stamford, Conn.

[21] Appl. No.: 89,639

[22] Filed: Oct. 29, 1979

[51] Int. Cl.³ .................... F15B 13/042; F15B 13/06
[52] U.S. Cl. .................................. 60/385; 137/625.3;
137/625.63; 137/625.66; 137/625.68; 180/132;
180/139
[58] Field of Search ...................... 137/625.66, 625.63,
137/625.3, 625.68; 60/385, 386; 251/31, 35;
180/132, 139, 141

[56] References Cited

U.S. PATENT DOCUMENTS

| | | | |
|---|---|---|---|
| 3,744,521 | 7/1973 | Paul | 137/625.68 |
| 3,862,643 | 1/1975 | Dezelan | 137/625.66 X |
| 4,003,202 | 1/1977 | Becker | 60/385 |
| 4,065,921 | 1/1978 | Baatrup et al. | 60/385 |
| 4,152,971 | 5/1979 | Leonard | 137/625.6 |

FOREIGN PATENT DOCUMENTS 1330608  9/1973  United Kingdom .

Primary Examiner—Irwin C. Cohen
Attorney, Agent, or Firm—Thomas R. FitzGerald; Jeffrey S. Mednick

[57] ABSTRACT

In a pressure compensated steering valve, the effect of an input steering signal is cancelled by connecting the spool valve actuator to the reservoir. A shiftable spool valve is acted upon by end cap actuators, which are in turn controlled by a hand pump that is operated by a steering wheel. The spool valve is provided with internal passageways which place the pressurized end cap actuator in restricted fluid communication with the reservoir in order to cancel the effect of the input steering signal at a predetermined rate.

4 Claims, 2 Drawing Figures

PRESSURE COMPENSATED STEERING SYSTEM

BACKGROUND

This invention relates to hydraulic steering systems, and, in particular, to a pressure compensated, non-feedback hydraulic steering system and valve.

Steering systems for heavy mobile equipment, particularly articulated vehicles that are used in construction, mining and logging, rely on hydraulic power controls for their operation. These power steering systems typically include a source of pressurized fluid, such as a pump, for delivering fluid under pressure to a pair of steering cylinders. The steering cylinders are connected to the wheels of the vehicle and are operable to steer the wheels. A directional control valve, usually a spool-type valve, controls the passage of fluid to and from the steering cylinders. Such spool valves usually have a neutral, centered position. They are shiftable to the left or right for operating the steering cylinders.

Large fluid forces act upon the directional control valve, so that some fluid power means is usually employed to operate the directional control valve. A typical steering system includes a steering wheel coupled to a hydraulic pump that operates a fluid actuator connected to the directional control valve. The steering wheel pump may be either manually driven or power assisted pump. Turning the steering wheel in a particular direction causes the fluid actuator to shift the directional control valve spool and thereby supply fluid to the head end of one steering cylinder and the rod end of the other cylinder.

One problem associated with hydraulic steering systems lies in giving the operator the control that is comparable to conventional steering wheel manipulations associated with a mechanical steering gear. In the latter, the turning radius remains constant when the operator stops rotating the steering wheel and the turn is completed by simply restoring the steering wheel to its initial position. In contrast, when the steering wheel of some hydraulic steering systems is stopped, the steering cylinders will continue to extend and contract causing the turning radius of the vehicle to continually decrease. The latter can only be stopped by returning the steering wheel to its initial position. This closes the directional control valve but leaves the steering cylinders at their respective extended and contracted positions so that the vehicle will make a constant radius turn. In order to end the turn, the steering wheel must be rotated in the opposite direction in order to reverse the operation of the steering cylinders and return the wheels to their initial position.

The foregoing mode of control, known as jerk steering, is difficult and imprecise. Accordingly, others have modified such a system to include a cancelling means that generates a feedback signal for cancelling the steering wheel input and simulating conventional steering. The feedback signal is transmitted from the articulated portion of the vehicle to the steering valve actuator by means of a linkage.

Such feedback linkages may be mechanical, hydraulic, or combined hydro-mechanical. An example of a variable feedback hydraulic linkage is shown in U.S. Pat. No. 4,003,202. There is shown a linkage including a pair of feedback cylinders which operate on the directional control valve actuator in order to cancel the steering wheel input in response to hydraulic signals derived from the steering cylinders.

The feedback linkage between the vehicle and the directional control valve is important because it cancels the steering wheel input and gives the operator a sense of steering similar to that of an automobile. Feedback linkages may come in various types and are applied in various ways, depending upon the kind of vehicle, the location of the operator, the steering valve and other parameters. Heretofore, feedback linkage components have been expensive and have required a high degree of precision in linkage location and attachment points or pivots. Although available feedback linkages provide good steering, all such linkages include some mechanism which eventually wears with age and thereby detracts from the high degree of precision that is usually demanded of such steering systems. Hence, it would be desirable to have a hydraulic steering system that steers in a conventional manner without a feedback linkage.

SUMMARY

It is an object of this invention to provide a new and improved hydraulic steering system.

It is a further object of this invention to provide a steering system that performs in a conventional manner but without the usual feedback linkage to the directional control valve.

It is still another object of this invention to provide a pressure compensated steering system in which the directional control valve is vented to a reservoir in order to return the directional control valve to its neutral position.

The invention includes a hydraulic control circuit that has a reservoir for storing fluid; means, such as a pump, for pressurizing the fluid; and further means, such as a directional control valve, for apportioning the pressurized fluid among a plurality of paths. Input means, such as a hand pump, is provided for changing the apportioning of said pressurized fluid. A cancelling means is provided for placing the apportioning means in fluid communication with the reservoir in order to cancel the effect of the input means without any feedback from the apportioned fluid.

More particularly, the invention includes a pressure compensated spool-type directional control valve. Pressure compensation is a well-known and desirable feature in steering control. Noncompensated valves are highly dependent upon the load and yield different flows for a given stroke. Pressure compensation provides a consistent output for a given input, regardless of the load. As a result, the wheels of the vehicle turn the same amount each time the steering wheel is turned a given amount.

Hence, in the preferred embodiment, a main pump delivers pressurized fluid to the main steering spool valve through a pressure compensator valve. The main spool has end cap actuators, one on each end of the main spool, which are in turn controlled by signal fluid from a hand pump. The hand pump is coupled to a steering wheel, jog stick, or other hand-held device which is under the control of the operator of the vehicle.

As the operator turns his steering wheel, the hand pump forces signal fluid into one end cap actuator and drains signal fluid from the other. The pressurized actuator moves and shifts the main spool in a given direction. The main spool shifts and pressurized fluid from the main pump is directed into the rod end of one of the steering cylinders and is directed into the head end of the other. As the vehicle completes its turn in the direction indicated by the hand pump, the cancelling means places the end cap actuators in fluid communication with a reservoir. The main spool is returned to its neutral position by any suitable biasing means, such as a spring. Whereas other systems provide complicated hydraulic, mechanical or hydro-mechanical feedback mechanisms for cancelling the input to the main spool, the cancelling means of the invention dispenses with such feedback systems by venting the end cap signal fluid to a reservoir.

In the preferred embodiment of the invention, the end cap actuators on the main spool valve are vented to the reservoir by means of a variable, restricted orifice which places the input signal to the end cap actuator into fluid communication with the reservoir. More specifically, the main spool valve includes fluid passages which establish variable fluid communication between the reservoir and the end caps when the main spool is displaced from its neutral position. The main spool is normally held in its neutral position by a balance spring. As the main spool valve is moved out of its neutral position in response to an input signal on one of its end cap actuators, certain fluid passages of the spool valve connect that end cap actuator in variable fluid communication with the reservoir. Accordingly, the pressurized actuator is slowly drained to tank as the balance spring recenters the main spool. Hence, there is no mechanical linkage between the steering valve; the steering system operates smoothly and at a predetermined or timed rate of cancellation.

The invention also includes a control valve having a housing with inlet and exhaust chambers, first and second motor ports, and a shiftable spool valve element for apportioning fluid between said motor ports. The control valve also includes an actuator means, such as end cap actuators, that are responsive to a fluid pressure signal for shifting the spool in accordance with that signal. Cancelling means are also provided for placing the actuator means in fluid communication with the exhaust chamber in order to cancel the effect of the signal. In the preferred embodiment, the cancelling means includes metering notches located in the housing adjacent to the end cap actuators of the spool.

Another feature of the invention is the provision of means for preventing a momentary loss of control when a pressurized steering cylinder is vented to a reservoir as a result of a change in direction. A recognized problem with most articulated vehicles is that it takes pressure to hold the vehicle in a turned position because of tire wind-up. Also, a vehicle's attitude to its surroundings can cause a cylinder port to be held at a pressure (overhauling load). When steering back such that a pressurized cylinder port is vented to a reservoir, the vehicle will lurch in the direction of turn at a rate greater than the input at the steering wheel. Consequently, a momentary loss of control and jerk is felt by the operator. To control this jerk, a set of small holes is provided in the mainspool so that, for most conditions, the holes meter out the oil, allowing the steering input to keep up with the articulation.

Having thus described the objects and summarized the salient features of the preferred embodiment of this invention, those objects and features will become apparent from the following detailed description of the invention when considered in conjunction with the accompanying drawings.

DETAILED DESCRIPTION

Figure 1:
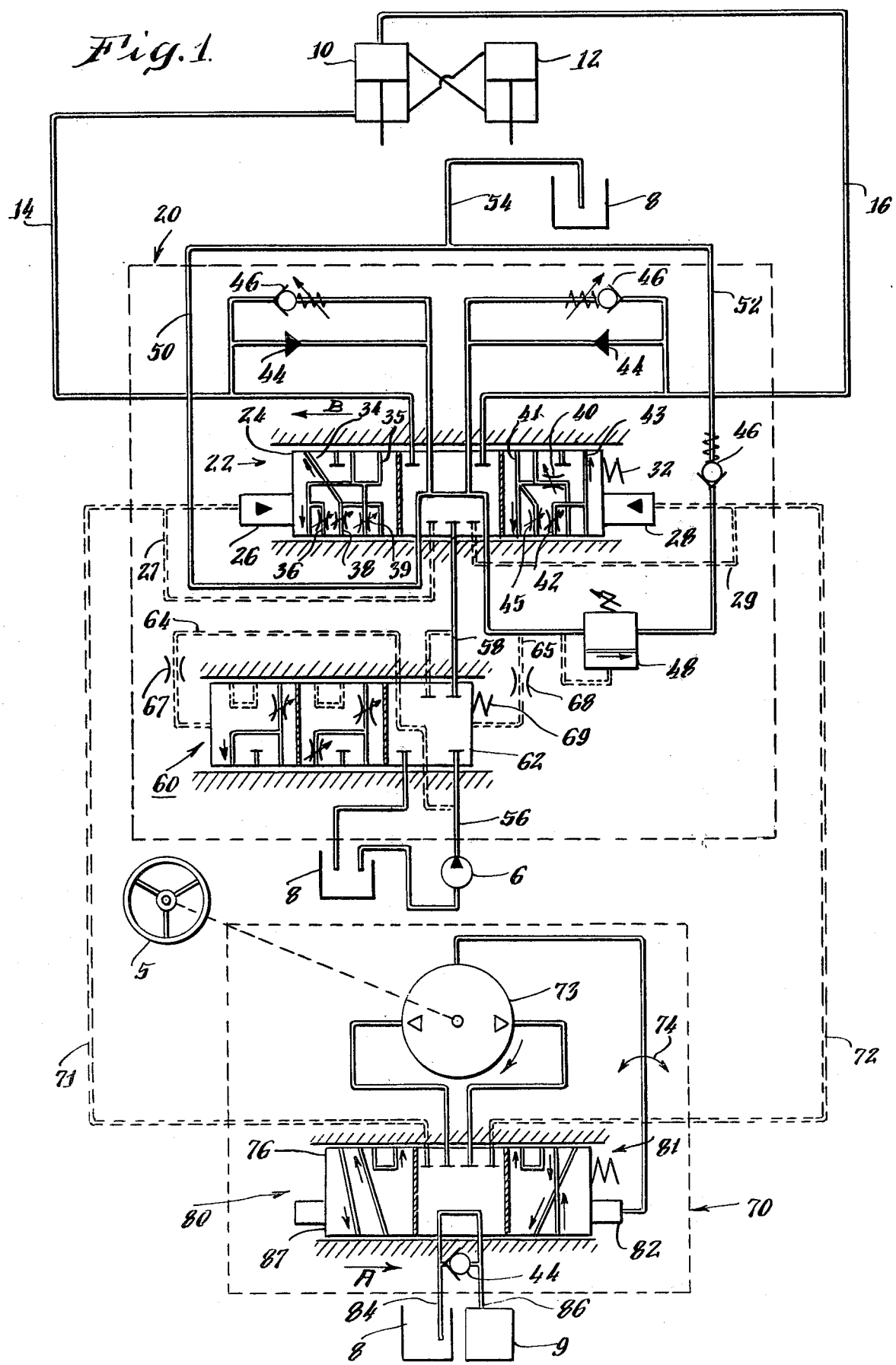
FIG. 1 shows a preferred embodiment of the hydraulic control circuit of the present invention.

Referring now to FIG. 1, there is shown a hydraulic circuit which includes a pair of steering cylinders 10, 12, a pressure compensated steering valve 20 and a hand pump 70. The pressure compensated steering valve 20 includes a main steering spool valve 22 and a pressure compensator spool valve 60. Pressure compensator valve 60 regulates the flow of pressurized fluid from a source of pressurized fluid 6 to the main steering spool valve 22. A spool 24 is shiftably positionable to direct fluid either into or out of steering cylinder conduits 14, 16 to thereby operate steering cylinders 10, 12. A balance spring 32 biases the spool toward its central or neutral position. End cap actuators 26, 28 are respectively connected by pilot control lines 71, 72 to hand pump 70. Hand pump 70 receives its input from an operator via a steering wheel 5 and supplies an output hydraulic signal via pilot lines 71, 72 to the pressure compensated steering valve 20.

Hydraulic fluid is drawn from a reservoir 8 and is pressurized by a pump 6 for passage along a fluid conduit 56 to pressure compensator valve 60. Pressure compensator valves are well known in the art and need not be further described except to the extent that it is necessary to understand the subject invention. Pressure compensator valve 60 maintains a constant flow of pressurized fluid to the main steering spool valve 22 independently of the load on steering cylinders 10, 12. The latter function is accomplished by signal lines 64 and 65, which respectively monitor the output of pump 6 and the load via steering cylinder conduit 14 or 16. The position of pressure compensator spool 62 is determined by the difference between a number of forces acting on spool 62, including the forces generated by the output pump pressure, the load pressure applied to spool 62, and the force of biasing spring 69. In this manner pressure compensator 60 maintains a constant flow through main steering spool valve 22 for any position of spool 24, regardless of changes in the output of pump 6 and the load on the cylinders 10, 12. Accordingly, pressurized fluid from pump 6 passes through conduit 56, pressure compensator valve 60 and on to steering valve input line 58.

Steering cylinders 10, 12 are operated by pressurized fluid that is delivered from main steering spool valve 22 along fluid conduit lines 14 and 16. The direction of operation of steering cylinders 10, 12 depends upon whether or not pressurized fluid is provided along conduit 14 or 16. The direction of fluid travel is controlled by the position of spool 24 of main steering spool valve 22. When spool 24 is shifted to the right, pressurized fluid from input line 58 is directed through a variable orifice 38 to cylinder conduit line 14. Simultaneously, fluid in cylinder conduit 16 is drained to reservoir 8 via internal spool passage 35, reservoir chamber 50 and reservoir manifold 54. When spool 24 is shifted to the left, pressurized fluid is directed along internal passage 43 to cylinder conduit 16 and fluid in cylinder conduit 14 is drained through internal spool passage 41. Anti-cavitation check valves 44, overload relief valves 46 and main relief valve 48, protect the cylinders 10 and cylinders 10 and 12, valve 20, respectively, against pressure loss, voids and excessive pressure.

Spring 32 biases the spool 24 toward its central or neutral position. End cap actuators 26, 28 are operable to receive an input pressure signal from hand pump 70 and shift spool 24 to one side or the other in accordance with the pressure signal. End cap actuators 26, 28 receive their input pressure signals via pilot line 71, 72 of hand pump 70.

Contrary to other steering systems, the actuators 26, 28 for the subject invention are not provided with any feedback system for returning the actuators to a neutral position and are independent of the operation of steering cylinders 10, 12. Instead, the end cap actuators, 26, 28 are placed in fluid communication with reservoir 8, whenever the steering spool 24 is displaced from its neutral position. To this end, steering spool 24 provides internal passageways which connect the actuators 26, 28 to the reservoir 8. For example, when hand pump 70 applies a fluid pressure signal against end cap actuator 26, spool 24 shifts to the right, thereby placing end cap actuator 26 in fluid communication with passage 27. Passage 27 is connected to the reservoir 8 via variable, restricted orifice 36, internal passageway 35, exhaust passageway 50 and exhaust manifold 54. Thus, the pressurized signal fluid is drained out of end cap 26, and balance spring 32 recenters the spool 24 in its neutral position. End cap 28 is drained to reservoir 8 through internal passageway 35 and variable orifice 39. Accordingly, the main spool 24 is returned to its neutral position without any need for providing its actuators 26, 28 with any feedback connection to the steering cylinders 10, 12.

Likewise, when an end cap 28 is pressurized, spool 24 shifts to the left, end cap 28 is drained to reservoir 8 via restricted orifice 40, internal passageway 41, exhaust passageway 50 and manifold 54. End cap 26 is connected to reservoir 8 via restricted orifice 45, passageways 41, 50 and manifold 54.

An input steering signal along signal line 71, 72 also can be cancelled by returning the hand pump 70 to its neutral or center position as shown in FIG. 1. Hand pump 70 includes a bidirectional pump 73 which is turnable by a steering wheel 5 or other means. Pump 73 is mechanically coupled via linkage 74 to an actuator 82 on a spool 76 of hand pump spool valve 80. Hand pump spool valve 80 is schematically shown to be reciprocally slidably positionable. However, those skilled in the art will appreciate that hand pump spool valves are cylindrical valves which are rotatable in either a clockwise or counter-clockwise manner. Nevertheless, for purposes of illustration, the hand pump spool valve 80 is shown to have a reciprocal spool 76. In the neutral or center position spool 76 blocks fluid communication between signal lines 71, 72 and hand pump 73. When the operator desires to turn the vehicle in a given direction, spool 76 is shifted either left or right and a fluid power signal is transmitted from a pressurized inlet line 86 (that is maintained at a pressure greater than the pressure of fluid in reservoir 8) via the signal line 71 or 72 to the respective end cap 26 or 28. Pressurized inlet line 86 may draw its fluid from any suitable source 9 (such as an auxiliary pump or a return line) so long as the pressure of fluid through spool inlet line 86 is sufficient to operate end cap actuators 26, 28. Whenever an operator desires to cancel the input steering signals, the steering wheel is turned back to its centered position thereby returning the bi-directional pump 73 to the position shown in FIG. 1.

Having thus described the preferred embodiment of the steering system of the invention, a typical operation will hereinafter be described wherein the hand pump 70 is turned clockwise. As pump 73 rotates clockwise, the mechanical linkage 74 urges actuator 82 to shift spool 76 of hand pump spool valve 80 to the right. As spool 76 shifts to the right as indicated by arrow A. fluid from reservoir 9 passes to conduit 86, through an internal passageway provided in spool 76, through pump 73 then to signal line 72, and finally to end cap actuator 28. As the pressure builds up against end cap actuator 28, the main steering spool 24 shifts to the left as indicated by arrow B. Thereupon, pressurized fluid in line 58 is directed through main steering spool 24 to the head end of cylinder 10 and the rod end of cylinder 12 via cylinder conduit 16 and spool passage 43. Likewise, the rod end of cylinder 10 and head end of cylinder 12 are drained to reservoir 8 via conduit 14 and internal spool passage 41.

Simultaneously with the foregoing, main spool 24 also places both end cap actuators 26, 28 in fluid communication with reservoir 8. A variable restricted orifice 40 connects the pressurized fluid in actuator 28 with reservoir 8 via signal line 29 and internal passage 41. Fluid in actuator 26 is drained to reservoir 8 via a fluid passageway including signal line 27, spool passage 41, exhaust passageway 50 and manifold 54. The fluid pressure against actuator 28 is thus gradually drained off through restricted orifice 40 and the balance spring 32 on steering spool 24 returns steering spool 24 to its centered position.

Figure 2:
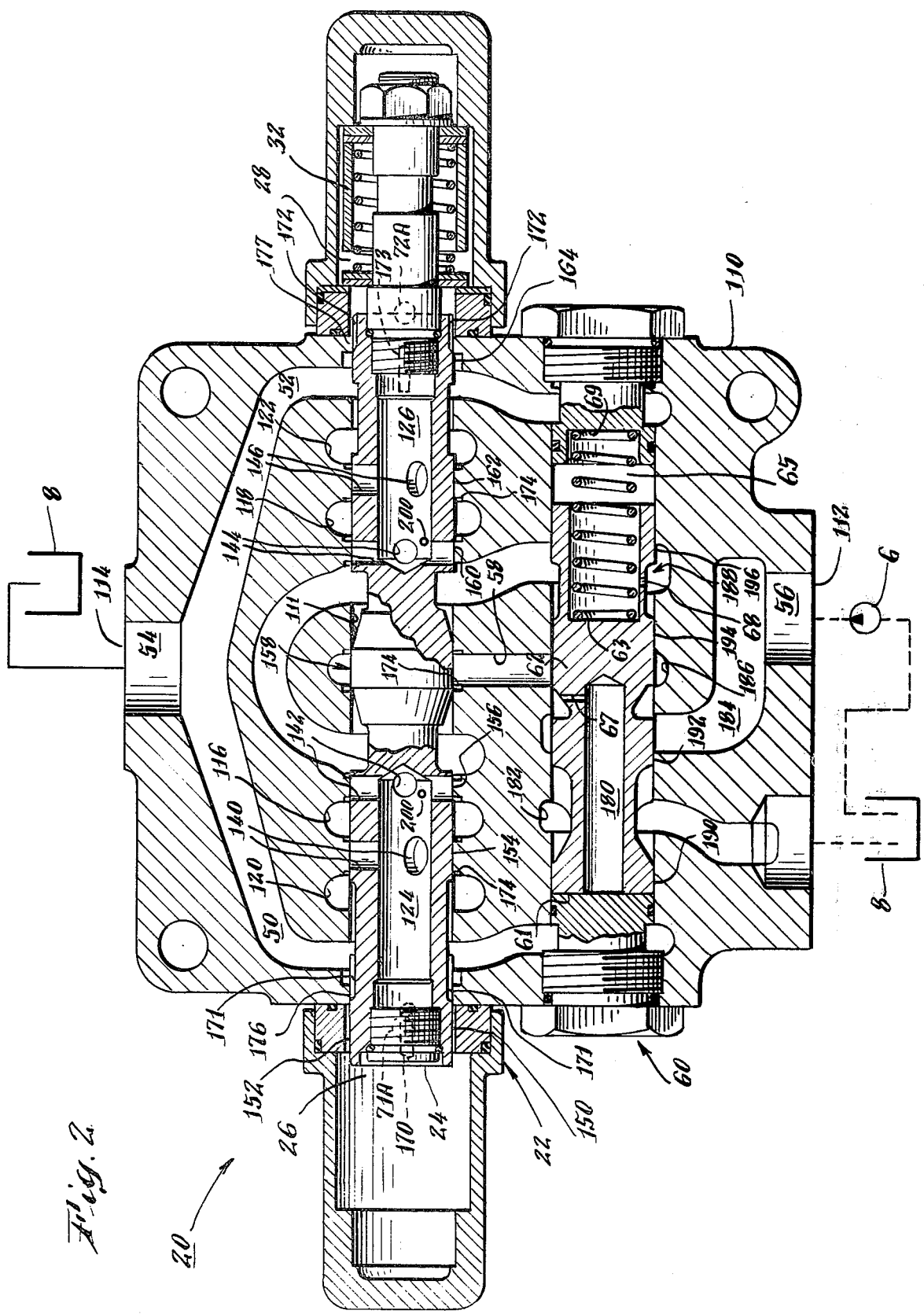
FIG. 2 shows a sectional view of the pressure compensated steering valve of the invention.

Turning now to FIG. 2 (where like reference numerals refer to the schematic elements identified in FIG. 1) there is shown the main steering valve 20 of the invention, including main spool valve 22 and pressure compensator valve 60. Spool 24 of main spool 22 fits within valve bore 111 in housing 110. Shiftable spool 24 has an outside diameter 150 which is smaller than the valve bore 111. Spool 24 further includes a plurality of raised lands 152, 154, 156, 158, 160, 162 and 164 which control fluid communication among the various chambers and passageways as will be described hereinafter.

Housing 110 further includes first and second motor chambers 116, 118, first and second intermediate chambers 120, 122, a high (pump) pressure chamber 58, and a lower pressure chamber 188. The difference in pressure between chambers 58 and 188 is approximately 50 to 100 psi due to the pressure drop across spool 24. Shiftable valve spool 24 is provided with first and second internal flow passages 124, 126. First and second transverse passages 140, 142 are in fluid communication with the first internal flow passage 124. Third and fourth transverse passages 144, 146 are in communication with second internal flow passage 126. The four passages 140, 142, 144, 146 selectively provide for fluid communication between internal flow passages 124, 126 and cylinder chambers 116, 118 and intermediate chambers 120, 122.

The pressure compensator valve 60 also resides inside housing 110. A plurality of fluid chambers surround shiftable spool 62 of pressure compensator valve 60. These fluid chambers include reservoir chambers 50, 52, bypass chamber 182, high pressure chamber 58, supply chamber 184, and lower pressure chamber 188. Spool 62 has a plurality of raised lands 190, 192, 194 and 196. An internal passageway 180 extends through one end of spool 62 and a first restricted orifice 67 is disposed between passageway 180 and the space between lands 192 and 194. Spring 69 is seated in spring cavity 65 and bears against an end surface 63 of spool 62 for biasing the spool 62 to the left. Pressurized fluid from pump 6 bears against left end surface 61 via the fluid path from high pressure chamber 184, restricted orifice 67, and internal passageway 180. A second restricted orifice 68 between lands 194 and 196 communicates oil pressure in 188 with that in the spring cavity 65. Lower pressure chamber 188 is in fluid communication with the reservoir 8 when the spool 24 is in its neutral position; chamber 188 monitors the load on the pressurized cylinder chamber (116 or 118) when spool 24 is shifted. Compensator spool 62 operates in a manner well known to maintain a constant flow through main spool valve 22 regardless of changes in the loads on the steering cylinders 10, 12, and cylinder chambers 116, 118.

End cap actuators 26, 28 are hand pump signal fluid chambers that are located adjacent opposite sides of main spool 24. Signal fluid enters actuator 26 through signal fluid port 71A; signal fluid enters actuator 28 through signal port 72A. The spool 24 is shifted like a plunger as signal fluid pressure rises in one of the actuators 26, 28. As the spool 24 is shifted, pressurized fluid from main pump 6 is directed into one or the other steering cylinders 10, 12 as described above.

The cancelling means of the invention includes a plurality of sets of axially extending metering grooves 170, 171, 172, 173 in the outside surface of spool 24 at opposite ends thereof. These grooves include outer sets 170 and 172 that extend from respective end cap actuators 26, 28 to a terminal position. Grooves 170 and 172 and lands 176, 177 correspond to the variable restricted orifices 36 and 40 of FIG. 2 and control the rate on cancellation. Inner grooves 171, 173 extend from a starting position axially spaced from the housing lands 176, 177 adjacent the opposite ends of spool 24 to a position approximately half way into the reservoir chambers 50, 52. Grooves 176 and 177 correspond to the variable restricted orifices 39 and 45 of FIG. 1. Those skilled in the art will appreciate that the fluid passage established by 176, 177, 39 and 45 could also be a fixed restriction or unrestricted.

When actuator 28 is pressurized, the spool 24 shifts toward the actuator 26. Outer grooves 172 establish a variable restricted fluid passage between actuator 28, exhaust passageway 52 and reservoir 8. At the same time, inner grooves 171 (on the opposite end of spool 24) establish a variable restricted fluid passageway between actuator 26, exhaust passageway 50 and reservoir 8. The outer grooves 170, 172 thus control the cancellation of the hand pump pressure signal by placing the actuators 26, 28 in variable restricted fluid communication with the reservoir. Inner grooves 171, 173 simultaneously place the non-pressurized actuator in fluid communication with the reservoir 8 in order to quickly return the spool 24 to its neutral or centered position.

Each set of grooves 170–174 includes two grooves that are spaced 180 apart; adjacent outer and inner sets 170, 171 and 172, 173 are offset from each other 90. The depth of the grooves may vary, depending upon the desired rate of cancellation. Deep outer grooves 170, 172 tend to quicken the time for cancellation, whereas shallow outer grooves will yield a slower response. Accordingly, other spacings and configurations of the grooves 170–174 are deemed to be within the skill of one trained in the art of hydraulic steering systems.

An additional feature of steering valve 20 is the provision of a set of small metering holes 200 in spool 24. Metering holes 200 slowly drain fluid out of the cylinders and thus prevent the cylinders from lurching when the cylinders have been held at pressure (overhauling) and that pressurized fluid is vented to the reservoir 8 as the steering wheel changes direction.

In operation, a hand pump signal is applied via conduit 72 to end cap signal port 72A. As pressure builds up against the end of spool 24, the spool is shifted to the left, thereby establishing fluid communication between the high pressure input line 58 and cylinder chamber 118 via third transverse passage 144, second internal passage 126 and fourth transverse passage 146. Cylinder port 116 is placed in fluid communication with reservoir 8 via a passageway formed by second transverse passage 142, first internal passageway 124 and first transverse passage 140, intermediate chamber 120 and reservoir passageway 50. Simultaneously with the foregoing, outer grooves 172 of spool 24 move away from housing land 177, thereby establishing fluid communication with the tank 8 via manifold 54 and exhaust passageway 52. Inner grooves 171 move toward housing land 176 to place actuator 26 in fluid exhaust communication with reservoir 8. Accordingly, the hand pump signal pressure is drained to tank, and main spool 24 is returned to its centered position via balance spring 32.

While there has been described what is considered to be a preferred embodiment of the invention, it will be obvious to those skilled in the art that changes and modifications may be made therein without departing from the spirit and scope of the invention as defined by the appended claims.

What is claimed is:

1. A hydraulic steering control system comprising;
   a. a reservoir for storing fluid;
   b. a main pump for pressurizing said fluid;
   c. a pair of steering cylinders;
   d. a multiposition steering control spool valve having a displaceable spool, means for biasing said spool toward a predetermined position, said spool having a plurality of lands for apportioning said pressurized fluid between said steering cylinders in accordance with the position of the spool of said valve as the spool is displaced from said predetermined position;
   e. first and second signal fluid chambers disposed one on each end of said spool for receiving pressurized signal fluid to displace said spool from said predetermined position; a rotatable hand pump in fluid communication with said signal fluid chambers for pressurizing one of said chambers in accordance with the rotation of said hand pump, and
   f. cancelling means comprising
      (i) first and second sets of outer axial grooves in the outer surface of the ends of said spool adjacent to said first and second signal fluid chambers for establishing fluid communication between a pressurized signal fluid chamber and the reservoir when the spool is displaced from its predetermined position and
      (ii) first and second sets of inner axial grooves in the outer surface of said spool and spaced from said outer grooves for establishing fluid communication between the non-pressurized signal fluid chamber and the reservoir when the spool is shifted in order to quicken the return of said biased spool to said predetermined position.

2. The hydraulic steering system of claim 1 wherein said control spool valve comprises a housing having inlet and exhaust chambers, first and second motor ports, a shiftable valve element having means for apportioning fluid between said motor ports and a plurality of metering holes for allowing pressurized fluid to slowly drain from said motor ports.

3. A pressure compensated hydraulic control valve comprising a housing having inlet, exhaust and first and second motor chambers, an elongated shiftable spool, means for biasing said spool toward a predetermined portion, said spool having a plurality of lands for directing hydraulic fluid to and from said chambers, two fluid actuators, each actuator adjacent opposite ends of said spool for shifting said spool toward the opposite actuator and cancelling means comprising (i) first and second sets of outer axial grooves in the outer surface of the end of said spool adjacent the actuators for establishing fluid communication between an exhaust chamber and the actuator that shifts the spool, thereby returning said biased spool to its predetermined position and (ii) first and second sets of inner axial grooves in the outer surface of said spool and spaced from said outer grooves for establishing fluid communication between an exhaust chamber and the other actuator in order to quicken the return of said biased spool to its predetermined position.

4. The control valve of claim 3 wherein said spool has a plurality of metering holes for establishing initial restricted fluid communication between a pressurized motor chamber and an exhaust chamber.

* * * * *